US012226744B2

(12) United States Patent
Anand et al.

(10) Patent No.: US 12,226,744 B2
(45) Date of Patent: Feb. 18, 2025

(54) MIXING BOWL FOR STAND MIXER WITH HIGH TOLERANCE PIN HOLE LOCATION

(71) Applicant: WHIRLPOOL CORPORATION, Benton Harbor, MI (US)

(72) Inventors: Prabhjee Anand, Pune (IN); John W. McConnell, St. Joseph, MI (US); Brandon Tyler Mock, St. Joseph, MI (US); John Jay Myers, Saugatuck, MI (US); Nicholas Hill Schutte, St. Joseph, MI (US); Ben C. Shao, Clarendon Hills, MI (US)

(73) Assignee: WHIRLPOOL CORPORATION, Benton Harbor, MI (US)

( * ) Notice: Subject to any disclaimer, the term of this patent is extended or adjusted under 35 U.S.C. 154(b) by 608 days.

(21) Appl. No.: 17/402,869

(22) Filed: Aug. 16, 2021

(65) Prior Publication Data

US 2023/0047574 A1 Feb. 16, 2023

(51) Int. Cl.

*B01F 35/42* (2022.01)
*B01F 27/805* (2022.01)
*B01F 35/51* (2022.01)

(52) U.S. Cl.

CPC ............ *B01F 27/805* (2022.01); *B01F 35/51* (2022.01)

(58) Field of Classification Search

CPC ........ B01F 35/51; B01F 35/42; B01F 27/805; B01F 35/50
USPC .......................................................... 220/660
See application file for complete search history.

(56) References Cited

U.S. PATENT DOCUMENTS 3,493,249 A 2/1970 Conrad, Jr. et al.
3,725,993 A 4/1973 Siler
5,556,497 A * 9/1996 Murphy ............ B29C 66/73116 156/304.6
6,152,636 A 11/2000 Nass
8,182,135 B2 5/2012 Blackburn et al.
D668,915 S 10/2012 Drees
D701,420 S 3/2014 Benoit et al.
9,220,372 B2 12/2015 Benoit et al.
9,333,472 B2 5/2016 Paget et al.
2003/0042036 A1 * 3/2003 Lambiaso .............. H02G 3/123 174/58

FOREIGN PATENT DOCUMENTS

JP 2004245030 A 9/2004
KR 20100005914 A 1/2010

* cited by examiner

*Primary Examiner* — Stephen J Castellano
(74) *Attorney, Agent, or Firm* — Price Heneveld LLP

(57) ABSTRACT

A mixing bowl for a stand mixer includes a body defining an interior and an exterior. The body has first and second mounting flanges extending outwardly from opposite sides of the exterior and defining respective cavities open at least on bottom sides of the mounting flanges. The mixing bowl further includes first and second inserts fixedly received in the respective cavities of the first and second mounting flanges. The inserts define respective pin holes for receiving mounting pins of a bowl-lift mechanism of the stand mixer, the first and second pin holes being located relative to each other at a first tolerance and relative to the respective first and second flanges at a second tolerance lower than the first tolerance.

17 Claims, 9 Drawing Sheets

MIXING BOWL FOR STAND MIXER WITH HIGH TOLERANCE PIN HOLE LOCATION

BACKGROUND OF THE DISCLOSURE

The present disclosure generally relates to a mixing bowl for a stand mixer, and more specifically, to a mixing bowl having inserts for compatibility with a bowl lift mechanism.

Certain types of stand mixers include a "bowl-lift" mechanism for retaining a mixing bowl with the mixing head for use in processing ingredients within the bowl. In general, such mechanisms include a pair of arms, or a unitary support frame, with pins positioned on the ends thereof. The pins are configured to closely engage with pin holes in mounting features that are attached to the exterior of the mixing bowl to both support the mixing bowl above the base of the mixer and/or the work surface and to maintain the general position of the mixing bowl against the rotational forces and vibration that result from the use of the mixer (and desired implement) within the bowl to prevent dislodgement of the bowl from the mechanism and the mixer in general. A close fit may be desired between the pins and the corresponding holes on the mixing bowl to, for example, minimize vibration of the bowl during use. This close fit requires relatively high manufacturing tolerances for both the location and assembly of the pins and of the mixing bowl. Some materials that may be otherwise desirable for fabrication of a stand mixer bowl may not be amenable to fabrication to the tolerances needed for the desired fit on a bowl-lift mechanism.

SUMMARY OF THE DISCLOSURE

According to one aspect of the present disclosure, a mixing bowl for a stand mixer includes a body defining an interior and an exterior. The body has first and second mounting flanges extending outwardly from opposite sides of the exterior and defining respective cavities open at least on bottom sides of the mounting flanges. The mixing bowl further includes first and second inserts fixedly received in the respective cavities of the first and second mounting flanges. The inserts define respective pin holes for receiving mounting pins of a bowl-lift mechanism of the stand mixer, the first and second pin holes being located relative to each other at a first tolerance and relative to the respective first and second flanges at a second tolerance lower than the first tolerance.

According to another aspect of the present disclosure, a fixture for locating first and second pin holes with respect to mounting flanges of a mixing bowl for a stand mixer includes a base configured to support a body of the mixing bowl in an inverted position. The body defines an interior and an exterior and includes first and second mounting flanges extending outwardly from opposite sides of the exterior and defining respective cavities open at least on bottom sides of the mounting flanges. The fixture further includes first and second retention features mounted on the base and collectively defining first and second features positioned to respectively contact the exterior of the mixing bowl to position the mixing bowl in a location with respect to the base at a first tolerance and first and second location features further mounted on the base and positioned to locate first and second pin holes, for receiving mounting pins of a bowl-lift mechanism, in inserts assembled with the mounting flanges of the mixing bowl relative to each other at a second tolerance that is higher than the first tolerance.

According to yet another aspect of the present disclosure, a method for making a mixing bowl for a stand mixer includes molding a body of the mixing bowl of a first material according to a first tolerance the body defining an interior and an exterior. The body includes first and second mounting flanges extending outwardly from opposite sides of the exterior and defining respective cavities open at least on bottom sides of the mounting flanges. The method further includes locating first and second pin holes relative to each other at a second tolerance that is higher than the first tolerance in connection with assembly of the inserts with the mounting flanges of the mixing bowl. The first and second pin holes are configured for receiving mounting pins of a bowl-lift mechanism.

These and other features, advantages, and objects of the present disclosure will be further understood and appreciated by those skilled in the art by reference to the following specification, claims, and appended drawings.

Figure 1:
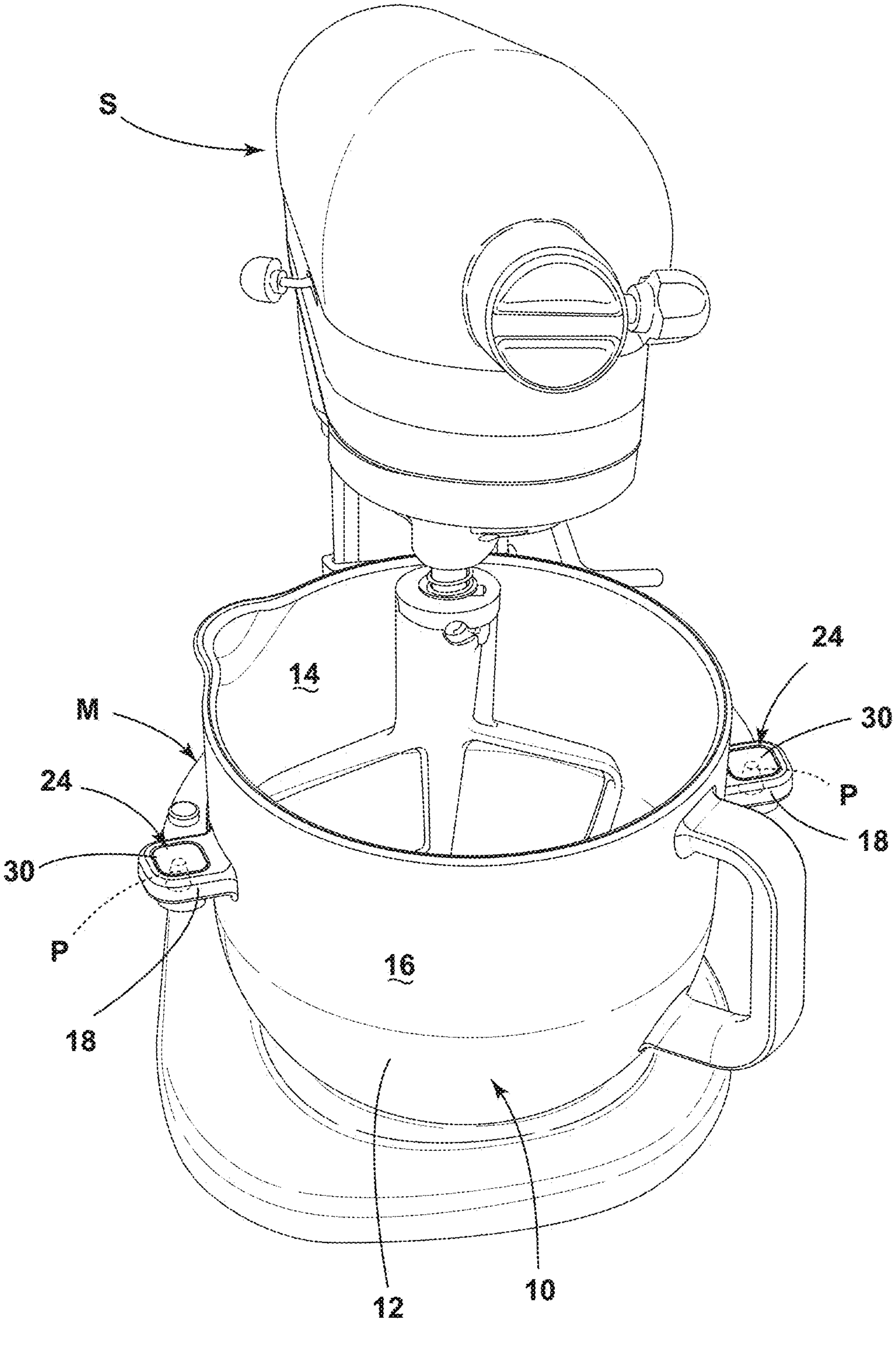
FIG. 1 is a perspective view of a mixing bowl according to an aspect of the present disclosure shown assembled with a bowl-lift mounting mechanism of a stand mixer.

The components in the figures are not necessarily to scale, emphasis instead being placed upon illustrating the principles described herein.

DETAILED DESCRIPTION

The present illustrated embodiments reside primarily in combinations of method steps and apparatus components related to a mixing bowl for a stand mixer and related structures and method for fabrication of the mixing bowl. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

For purposes of description herein, the terms "upper," "lower," "right," "left," "rear," "front," "vertical," "horizontal," and derivatives thereof shall relate to the disclosure as oriented in FIG. 1. Unless stated otherwise, the term "front" shall refer to the surface of the element closer to an intended viewer, and the term "rear" shall refer to the surface of the element further from the intended viewer. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises a . . . " does not, without more constraints, preclude the existence of additional identical elements in the process, method, article, or apparatus that comprises the element.

Referring to FIGS. 1-6, reference numeral 10 generally designates a mixing bowl for a stand mixer S. The mixing bowl 10 includes a body 12 defining an interior 14 and an exterior 16. The body has first and second mounting flanges 18 extending outwardly from opposite sides of the exterior 16 and defining respective cavities 20 open at least on bottom sides 22 of the mounting flanges 18. The mixing bowl 10 further includes first and second inserts 24 fixedly received in the respective cavities 20 of the first and second mounting flanges 18. The inserts 24 define respective pin holes 26 for receiving mounting pins P of a bowl-lift mechanism M of the stand mixer S. The first and second pin holes 26 are located relative to each other at a first tolerance and relative to the respective first and second mounting flanges 18 at a second tolerance lower than the first tolerance.

The particular arrangement and construction of the mixing bowl 10 described generally above, and in more detail below, is useful in connection with a particular implementation of the mixing bowl, wherein the body 12 is of a first material that generally exhibits, through the nature of the material and/or the techniques or methods associated with the fabrication of articles using the material, what is generally regarded as a low tolerance. In one aspect, the mounting of a mixing bowl with a stand mixer S using the bowl lift mechanism M shown in FIG. 1 is improved when the mixing bowl 10 engages closely with the mounting pins P positioned on the ends of the mechanism. This close engagement generally includes both the size and positioning of the pin holes 26 included on the mounting flanges 18 of the mixing bowl 10 matching the size and relative positioning of the mounting pins P to prevent unwanted movement or vibration of the mixing bowl 10 during use of the mixing bowl 10 in connection with the stand mixer M. As can be appreciated, the close engagement of the pin holes 26 with the mounting pins Pin this manner may require sizing of the pin holes 26 and mutual location therebetween according to a tolerance that is lower than that of some materials from which it may be desirable to use for at least the body 12 of the mixing bowl 10.

The incorporation of the inserts 24 discussed herein can allow for a structure in which the pin holes 26 can be sized and located according to the above-mentioned "second" tolerance that is higher than that which is realized by the material used for the body 12 of the mixing bowl 10. In one example, the present construction can allow for a mixing bowl 10 to be fabricated using ceramic for the body 12, while still including pin holes 26 sized and mutually located such that the mixing bowl 10 is compatible with a stand mixer S having a bowl-lift mechanism M with mounting pins P. It is to be appreciated that ceramic may not be easily or economically fabricated into a mixing bowl 10 for a stand mixer S with pin holes 26 formed directly therein according to the required tolerance, such as during casting (which may be the preferred type of molding used to fabricate a ceramic mixing bowl 10, for example). Notably, ceramics or other materials with a comparably low tolerance (e.g. glass, porcelain, clay, terra cotta, and the like) may be relatively brittle, particularly compared to other materials from which mixing bowls for stand mixers are fabricated, such as metal or plastic. The brittle nature of such materials is such that pin holes cannot be formed directly into solid mounting flanges 18 after casting, for example, by drilling, as the brittleness of the material leads to a higher tolerance due to fracturing or tear out of the material during drilling. Drilling into brittle materials can further lead to the introduction of small imperfections or cracks that may immediately lead to breakage (and an unacceptably high defect rate) or may propagate over time and use, particularly when subjected to vibration, and lead to breakage in the field. In this manner, the mixing bowl 10 of the present disclosure implements a structure where the body 12 of the mixing bowl 10 can be molded (e.g., cast) according to acceptable tolerances with durable geometry, particularly of the mounting flanges 18, while using inserts 24 to define the pin holes 26 in an arrangement where the inserts can be located at a tolerance similarly achievable in connection with the ceramic (or other low tolerance) material, but in which the pin holes 26 can be sized and located relative to each other according to a higher tolerance acceptable for use with a bowl lift mounting mechanism M of a stand mixer S, without specific modification to the mounting pins P or the mounting mechanism M.

By way of various non-limiting examples, a mixing bowl 10 with a body 12 of cast, and subsequently fired, ceramic may have a manufacturing tolerance according to DIN ISO 40680 standards, wherein cast ceramics are considered to have a "coarse" tolerance of at least 0.1 mm, for dimensions corresponding with diameters of at least +/−3 mm, and up to +/−5%. Additionally, cast ceramics may have a tolerance of at least +/−0.05 mm and up to +/−5%, for diameters less than 3 mm, and a straightness having a maximum crescent height at 0.5% of the total feature length. As would be understood, based on the particular feature of the body 12 of the mixing bowl 10 described herein, these tolerances may, according to an example, correspond with what is designated the "low" tolerance herein.

By contrast, the pins P of the example bowl lift mechanism M with which the present mixing bowl 10 is configured to be compatible, may be manufactured to tolerances meeting or exceeding the DIN ISO 2768-m standards (or other comparable national or international standards), wherein a "fine" tolerance (achieved by machining or other reductive manufacturing processes) allows for a deviation of, at most, +/0.1 mm for dimensions between 6 mm and 30 mm (i.e., the order of the diameter of pins P) and, at most, +/−0.3 mm for dimensions between 120 mm and 400 mm (i.e., the order of the spacing of pins P). In further examples, the pins P and corresponding pin holes 26 may be manufactured to tighter tolerances, including for example, those in accordance with ISO standards for sliding- or location-type clearance fits (H7/g6 and H7/h6, respectively, for holes and G7/h6 and H7/h6, respectively, for shafts), which may correspond with pin holes 26 having a diameter 28 (FIGS. 3 and 6) with a tolerance of +20 μm and −5 μm, for a "sliding" fit, and +15 μm and −0, for a "location" fit. In a further aspect, the particular tolerance of the location and size of the pin holes 26 can be determined based on statistical analysis of the stackup between the location and sizing tolerance to determine the true hole size and locations to achieve the desired sliding or location fit of the pins P within the pin holes 26 over a desired number of samples (e.g., up to 99% or higher), given the generally achievable tolerance of the location of the pins P and the pin holes 26. As would be understood, these tolerances can correspond, in various implementations, with what is designated the "high" tolerance herein, and can be assessed using designated or derived manufacturing specifications and/or actual statistical analysis of a statistically-significant number of actual samples of an embodiment of the mixing bowl 10 according to the description herein.

Figure 2:
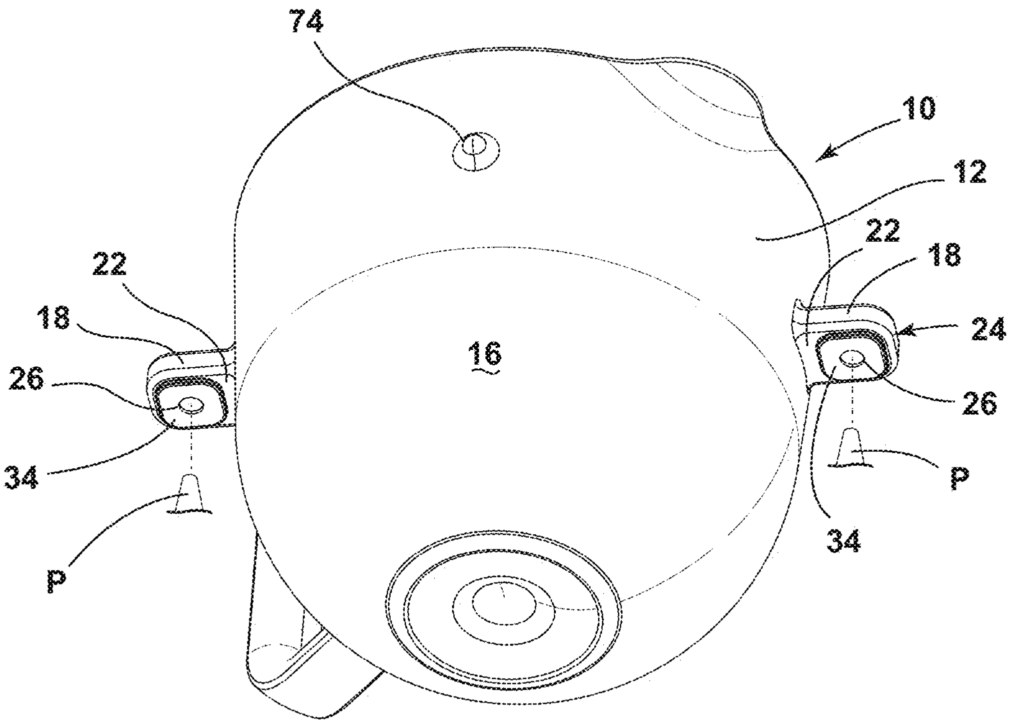
FIG. 2 is a bottom perspective view of the mixing bowl.
Figure 3:
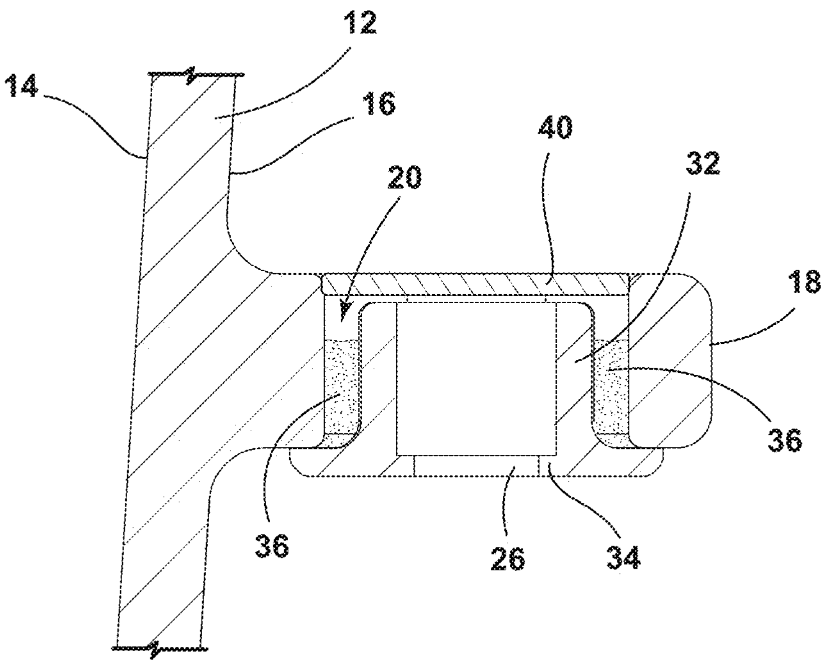
FIG. 3 is a cross-section view of a mounting flange of the mixing bowl with an insert having a pin hole therein.

Returning to the specific example of the mixing bowl 10 shown in FIGS. 1-3, the above-mentioned mounting flanges 18 are integral with the body 12 of the mixing bowl 10 and may be, accordingly, formed with the body 12 during molding (e.g. casting) thereof. The flanges 18 can be located according to the particular configuration of mixing bowl 10, which may vary in size and/or stylistically, and the particular configuration of the bowl-lift mechanism M with which the mixing bowl 10 is specified for use. In general, the mounting flanges 18 may be positioned on opposite sides of the body 12, including in a generally aligned manner with respect to a line extending through the center of the diameter of body 12 and may be positioned toward the vertical middle of the body 12, although such positioning may vary, so as to be visible to the user during assembly of the mixing bowl 10 with the bowl-lift mechanism M, while being in a location that promotes stability of the mixing bowl 10 during use. The particular size and shape of the mounting flanges 18 can, similarly vary depending on the relative size of the body 12 with respect to the spacing of the pins P of the bowl-lift mechanism M and/or for stylistic purposes. In general, the mounting flanges 18 can be sized and structured to provide a desired degree of strength, given the particular material characteristics, and to accommodate the assembly of the inserts 24 therein, as discussed further below, according to the low tolerance level of the body 12 with enough positional variably to achieve the desired location of pin holes 26 therein according to the high tolerance desired therefor. In the illustrated example, the mounting flanges 18 are generally square loops that extend integrally from the body 12 of the mixing bowl 10 to define the interior cavities 20 within which the inserts are received (see FIGS. 3, 6, and 7). In the illustrated example, the cavities 20 are hollow inner portions of the mounting flanges 18 that extend therethrough in the vertical direction relative to the body 12 so as to be open on both the bottom sides 22 of the mounting flanges 18, as well as the top sides 30 thereof. In other configurations, particularly in connection with the variation of inserts 24 depicted in FIGS. 1-3, 7 and 8, the cavities 20 can be open only on the bottom sides 22 of the mounting flanges 18.

As discussed above, the mounting flanges 18 are sized and located on the body 12 according to the above-described low tolerance dimensioning, at least by way of their integral formation with the body 12. For the various reasons discussed above, the mounting flanges 18 may not be amenable to formation of pin holes 26 directly therein in a reliable or functionally acceptable manner. As such, the ceramic or other material from which body 12 and mounting flanges 18 are formed, does not achieve the desired high tolerance for the size and location of pin holes 26, the inserts 24 received therein are of a different material that accommodates location of the pin holes 26 at the desired high tolerance. In particular, the inserts 24 can be of metal, including aluminum, steel, or the like, or of a machinable plastic, such as acetal, Delran, polycarbonate (PC), high-density polyethylene (HDPE), or the like. In the example of FIGS. 1-3, the inserts can include tubular extensions 32 that define the pin holes 26 on the respective interiors thereof. The inserts 24 further include respective face plates 34 that extend outwardly from the lower ends of the tubular extensions 32 such that the pin holes 26 are exposed at the face plates 34, which extend away from the pin holes 26 outwardly toward the adjacent portions of the respective mounting flange 18, and in a direction normal to the pin hole 26, to generally enclose the cavity 20 on the bottom side 22 of the mounting flange 18. In this manner, the inserts 24 can be fabricated according to the desired high tolerance, at least with respect to the size of the pin holes 26, as discussed above. In one example, the holes may have a specified dimension of 9.6 mm and have a high tolerance according to a specified implementation of the term, as discussed above. In one aspect, this sizing of the pin holes 26 may correspond with a pin P of a specified dimension of 9 mm with tolerance corresponding to the pin hole 26.

The inserts are fixed in the mounting flanges 18 with a cured epoxy mass 36, as shown in FIG. 3. Notably, the particular configuration of the epoxy mass 36 may vary according to the specific implementation and may at least partially fill the respective cavity 20 between the outward-facing portions of the insert 24 and the cavity 20. The epoxy mass 36 may extend at least partially along the inward-facing surfaces of the tubular extensions 32 and the face plates 34 to achieve acceptable adhesion with the inserts 24. Similarly, the epoxy masses 36 may extend at least partially along the portions of the mounting flanges 18 that define the cavities 20 to achieve desired adhesion therewith and to, accordingly, retain the inserts 24 within the mounting flanges 18. In general, the epoxy mass 36 should be of a sufficient volume to maintain the position of the inserts 24 within the mounting flanges 18, particularly during use of the mixing bowl 10 in connection with the stand mixer 10 over time. As shown in FIG. 3, the inserts 24, particularly the tubular extensions 32 are undersized relative to the cavities 20 such that they can be assembled with positional variance on the order of, or otherwise, according to the low tolerance of the body 12 of the mixing bowl 10 to achieve the desired location of the pin holes 26 relative to each other according to the higher tolerance discussed above. The use of an epoxy mass 36 to fix the inserts 24 within the mounting flanges 18 can allow for the epoxy, which is initially a liquid before curing to solid form, to effectively take up, or compensate for, the difference in dimensions resulting from interaction between the high and low tolerances. In this manner, it can be said that the pin holes 26 are located with respect to the mounting flange 18 at the low tolerance, as their position therein can generally vary according to the variance in size and position of the mounting flanges 18, which is in accordance with the low tolerance of the material, as discussed above.

In one example, the pin holes 26 can be positioned at a relative distance (center-to-center) of about 264 mm+/−0.3 mm or, in one example, +/−0.1 mm in connection with a mixing bowl 10 where the body 12 has a diameter 38 of 222 mm+/−2 mm. In this manner, the face plate 34 may extend outwardly against the bottom side 22 of the respective mounting flange 18 by an amount on the order of the low tolerance such that the face plate 34 encloses the cavity 20 along the bottom side 22 of the mounting flange 18, regardless of the positional variance realized by the desired alignment of the pin holes 26.

As further illustrated in FIGS. 1-3, the mixing bowl 10 can also include a pair of covers 40 that generally visually enclose the cavities on the top faces 30 of the mounting flanges 18. The covers 40 can be affixed with the mounting flanges 18 by the epoxy masses 36. In other variations, the epoxy masses 36 can be colored to generally match the body 12 and can be molded in place to define a flat surface generally continuous with the top face 30 of the mounting flange 18. In one such variation, the pin hole 26 may be exposed on such surface.

Figure 4:
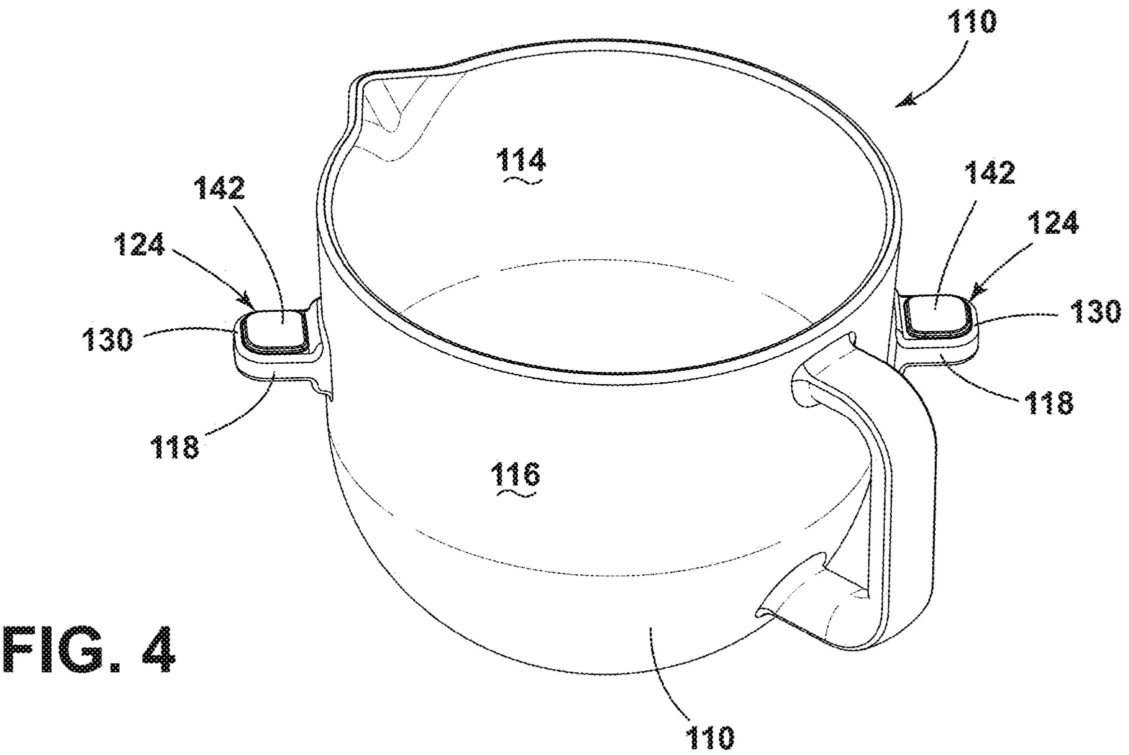
FIG. 4 is a perspective view of an alternative mixing bowl according to another aspect of the disclosure.
Figure 5:
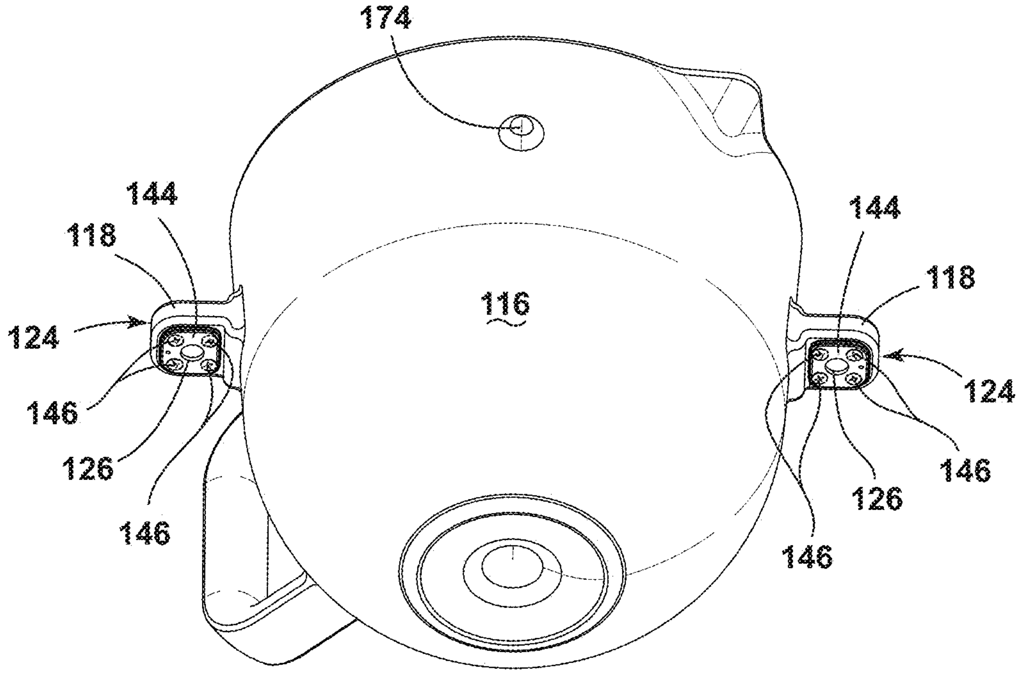
FIG. 5 is a is a bottom perspective view of the mixing bowl.
Figure 6:
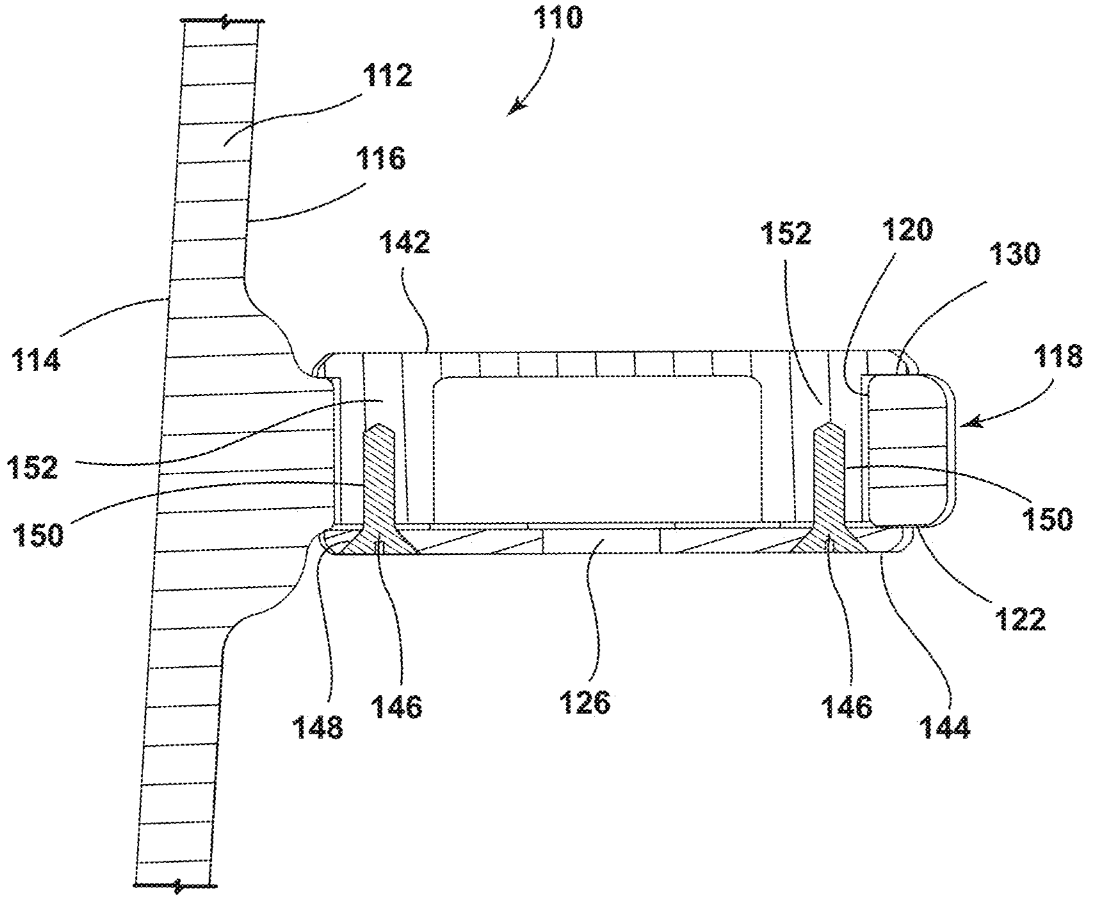
FIG. 6 is a is a cross-section view of a mounting flange of the mixing bowl with an alternative insert having a pin hole therein.

Turning to FIGS. 4-6, a mixing bowl 110 that is generally similar to the mixing bowl 10 is shown with another example of inserts 124 that can include pin holes 26 sized and located relative to each other according to the high tolerance and that can be assembled with the mounting flanges 118 at the low tolerance. In this respect, it is noted that the relative high and low tolerances can be the same as discussed above, as can the materials of both the body 112 of the mixing bowl 110 and the inserts 124, unless otherwise noted. The body 112 of the mixing bowl 110 can also be generally similar to the body 12 of the mixing bowl 10 discussed above, unless otherwise noted, with similar features being indicated with similar reference numbers increased by 100, such that any features not specifically discussed herein can be the same as the similarly-numbered features discussed elsewhere. In the variation of FIGS. 4-6, the cavities 120 of the first and second mounting flanges 118 are open on both the top sides 130 and the bottom sides 122 of the mounting flanges 118, and the inserts 124 comprise first and second face plates 142 and 144. The first and second face plates 142 and 144 respectfully abut the top sides 130 and the bottom sides 122 of the mounting flanges 118 and are fixed together using screws 146 (or other mechanical fasteners, such as bolts, rivets, or the like) that extend through the respective cavity 120 to compress the face plates 142 and 144 against the respective sides 130 and 122 of the mounting flanges 118. In the illustrated example, each insert 124 can include four screws 146 that extend through corresponding through holes 148 in the lower face plates 144 to engage with threaded holes 150 defined in bases 152 that extend downwardly from the upper face plates 142, with it being appreciated that other arrangements may be possible. In general, the through holes 148 and bases 152 are spaced toward the respective corners of the face plates 142 and 144 to allow room for the pin holes 126 near the center of the lower face plate 144 and the positional variance thereof to achieve the desired relative positioning of pin holes 126.

As shown in FIG. 6, the top sides 130 and bottom sides 122 of the mounting flanges 118 define inwardly-tapered portions 154 adjacent the respective cavities 120. In particular, the inwardly-tapered portions 154 can be defined by the rounded edges of the mounting flanges 118 along the interface between the cavities 120 and the respective top and bottom sides 130,122. In general, the above-described low tolerance associated with the material of which the body 112 of mixing bowl 110 is constructed results in the body 112 having relatively large radii, including of between about 2 mm and about 5 mm and, in one embodiment, about 2.5 mm, including at the location of the inwardly-tapered portions 154. In this manner, the upper face plates 142 and lower face plates 144 can specifically abut the respective top sides 130 and bottom sides 122 of the mounting flanges 118 at or within the tapered portions 154, which may effectively maintain the position of the inserts 124 with respect to the mounting flanges 118 upon appropriate tightening of the screws 146. In this respect, the inserts 124 can be said to be located with respect to the mounting flanges 118 at the low tolerance. The respective pin holes 126 can then be drilled into the lower face plates 144 at the first tolerance to achieve the desired sizing and positioning thereof, which can be done according to the above discussion.

As discussed above, in either of the above examples of the inserts 24 and 124, the body 12 or 112 of the mixing bowl 10 or 110 is molded (e.g. cast) from a material exhibiting the above-described low tolerance. The inserts 24 or 124 are, accordingly, assembled with the body 12 or 112 after the body 12 or 112 is molded. The pin holes 26 or 126 can be located relative to each other at the high tolerance and relative to the respective first and second flanges at the low tolerance, as discussed above, using a fixture, discussed further below, that retains the body 12 or 112 of the mixing bowl 10 or 110. This can be done, generally, in connection with the assembly of the inserts 24 or 124 with the body 12 or 112, as discussed further below, which may be commensurate with the assembly of the inserts 24 with the body 12 or subsequent to such assembly, such as during the formation of pin holes 126 with the inserts 124.

Figure 7:
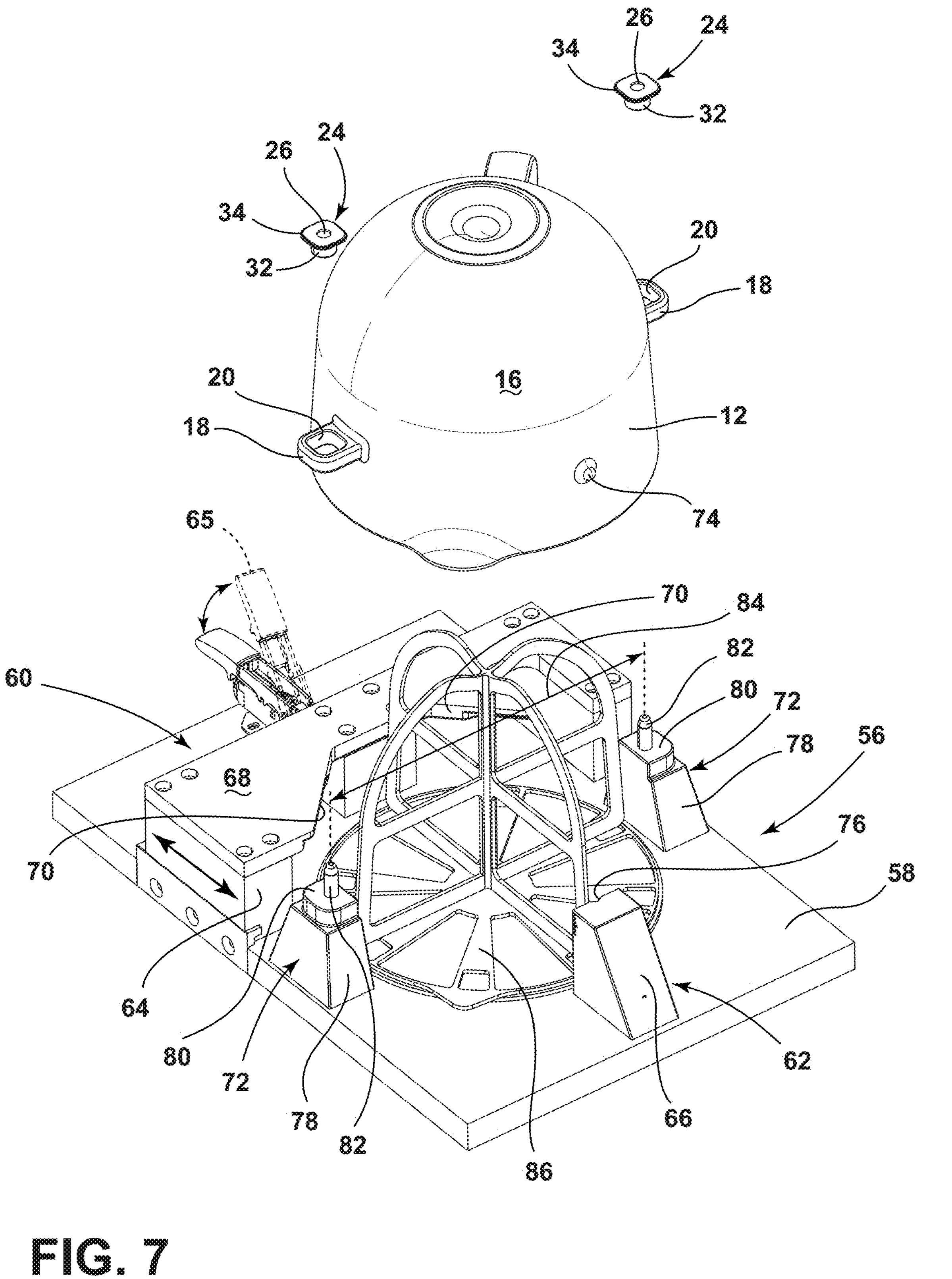
FIG. 7 is an assembly view of a fixture for locating the pin holes of the mixing bowl of FIG. 1, shown with the mixing bowl and inserts.
Figure 8:
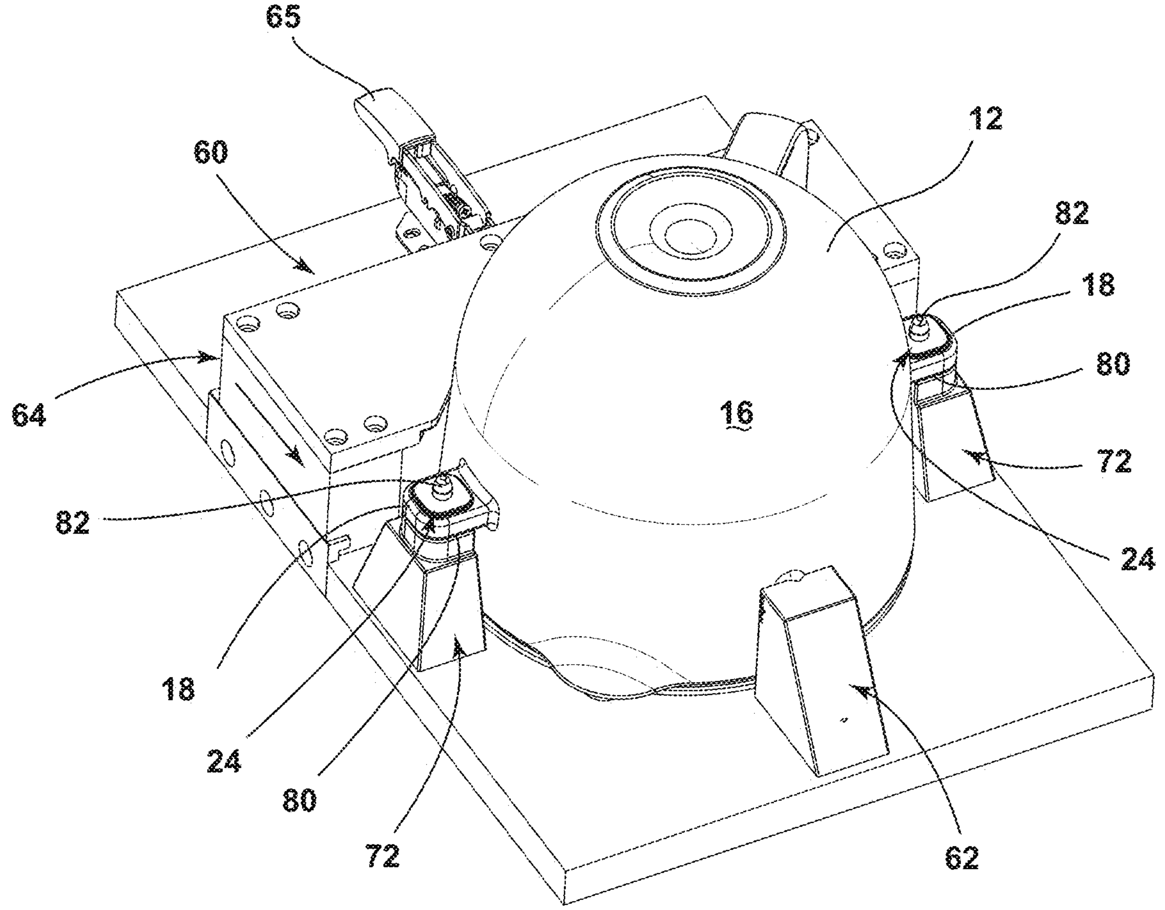
FIG. 8 is a perspective view of the mixing bowl received within the fixture of FIG. 7.

Turning to FIGS. 7 and 8, an example of a fixture 56 for locating the pin holes 26 with respect to mounting flanges 18 of the mixing bowl 10 according to FIGS. 1-3, in a particular example, is shown. The fixture 56 includes a base 58 configured to support the body 12 of the mixing bowl 10 in the depicted inverted position. In this manner, the base 58 can consist of a generally flat slab of metal, such as steel or the like. The fixture 56 further includes various retention features 60 and 62 mounted on the base 58 and collectively defining a number of features positioned to respectively contact the exterior 16 of the mixing bowl 10 to position the mixing bowl 10 in a specified location with respect to the base 58. As shown, the retention features can include a sliding body 64 and a fixed body 66. The sliding body 64 can include a retention plate 68 with two inwardly-angled surfaces 70 configured to contact the exterior 16 of the mixing bowl 10 at two locations oriented relative to each other at about 90° with respect to the center of the mixing bowl 10. The fixed body 66 can contact the exterior 16 of the mixing bowl 10 at a location opposite the sliding body 64 such that the angled surfaces 70 and the fixed body 66 define three points of contact with the body 12 to achieve the desired location of the body 12 with respect to the fixture 56. Notably, because the retention features contact the body 12 of the mixing bowl 10, the location achieved thereby can be said to be according to or within the low tolerance of the body 12. In the illustrated example, the body 12 further defines, on the exterior 16 of the mixing bowl 10 includes a protrusion 74 that serves as a further location feature. In particular, the protrusion 74 extends from the body 12 at a predetermined location. As the protrusion 74 extends from the body 12, the location established thereby is, similarly, according to the first tolerance. As shown, the position of the protrusion 74 is such that the protrusion 74 faces the fixed body 66 when the body 12 is received in the fixture 56. As such, the fixed body 66 can include a channel 76 for receiving the protrusion 74 during assembly of the body 12 of the mixing bowl 10 with the fixture 56 to further achieve the desired alignment therewith. Movement of the sliding body 64 can be realized by a vice clamp handle 65 that can be actuated to move the sliding body 64 into and out of engagement with the body 12 to allow for retention of the body 12 with the fixture 56 in the desired location and to remove the completed mixing bowl 10 once the pin holes 26 are located and fixed. As shown, the body 12 may be assembled with the fixture 56 with an internal support unit 86 positioned therein, which may be placed within the body 12 to allow stacking of the bodies 12 and/or completed mixing bowls 10 and/or other supplemental structural support therefor during manufacturing or shipping.

The fixture 56 further includes location features 72 further mounted on the base 56 and positioned to locate first and second pin holes 26 in the inserts 24 for assembly of the inserts 24 with the mounting flanges 18 of the mixing bowl 10. As discussed above, such positioning particularly positions the pin holes 26 relative to each other at the desired high tolerance. In particularly, the location feature 72 can include pedestals 78 with generally flat upper surfaces 80 and a fixture pin 82 extending upwardly therefrom. The upper surfaces 80 of the pedestals 78 are positioned to correspond with the locations of the mounting flanges 18 when the body 12 is received in the fixture 56 and may be in contact therewith or slightly spaced apart from the top sides 30 of the mounting flanges 18. The fixture pins 82 extend upward from the upper surfaces 80 of the pedestals 78 and are sized to closely receive the pin holes 26 of the inserts 24, including more closely than the pins P of the mounting mechanism M with which the mixing bowl 10 is intended for use. The fixture pins 82 are located relative to each other at a distance 84 that corresponds with the specified distance between the pins P of the mounting mechanism M with which the mixing bowl 10 is intended for use, including at a tolerance that is, at most, the tolerance desired for the relative spacing of the pin holes 26. In this manner, the pin holes 26 can be fixed relative to the mounting flanges 18 by first assembling the body 12 with the fixture 56, as discussed above and as shown in FIGS. 7 and 8. In this manner, the cavities 20 are exposed at the (upward-facing) bottom sides 22 of the mounting flanges 18 and are generally closed by the upper surfaces 80 of the pedestals 78 contacting the top sides 30 of the mounting flanges 18.

The inserts 24 can then be assembled onto the location features 72 by fitting the pin holes 26 over the respective fixture pins 82 with uncured epoxy applied to either or both of the mounting flanges 18 (into the exposed portion of the cavities 20 around the periphery thereof) or the outward-facing surfaces of the inserts 24 (i.e., along the outside of the tubular extension 32 and the face plate 34) such that the epoxy forms the epoxy mass 36 for fixing the insert 24 with the mounting flange 18, as discussed above. The epoxy can then be allowed to cure before removal of the completed mixing bowl 10 from the fixture 56. In this manner, the above-described positioning of the pin holes 26 relative to each other according to the desired high tolerance may be achieved.

Figure 9:
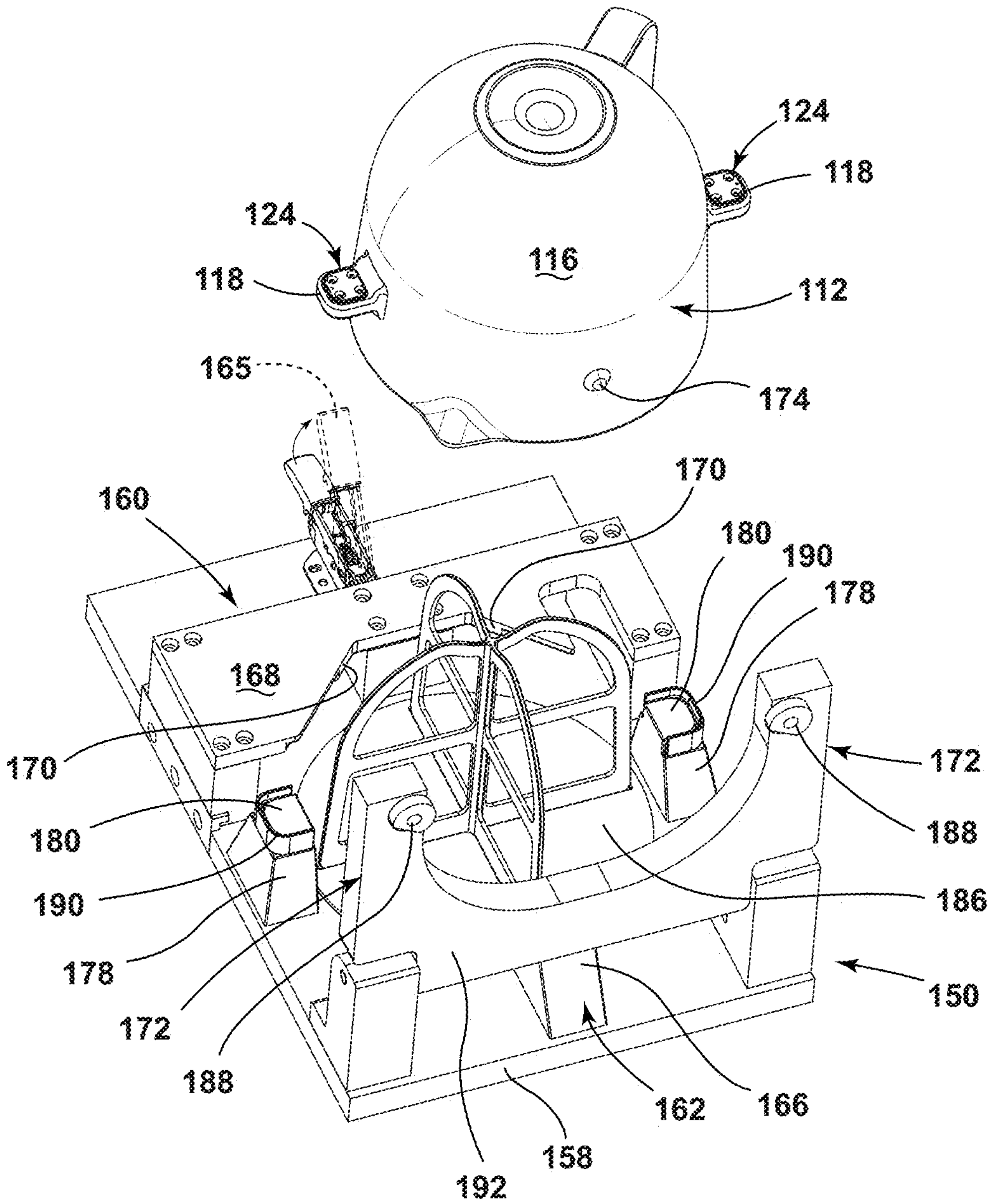
FIG. 9 is an assembly view of an alternative fixture for locating the pin holes of the mixing bowl of FIG. 4, shown with the mixing bowl.
Figure 10:
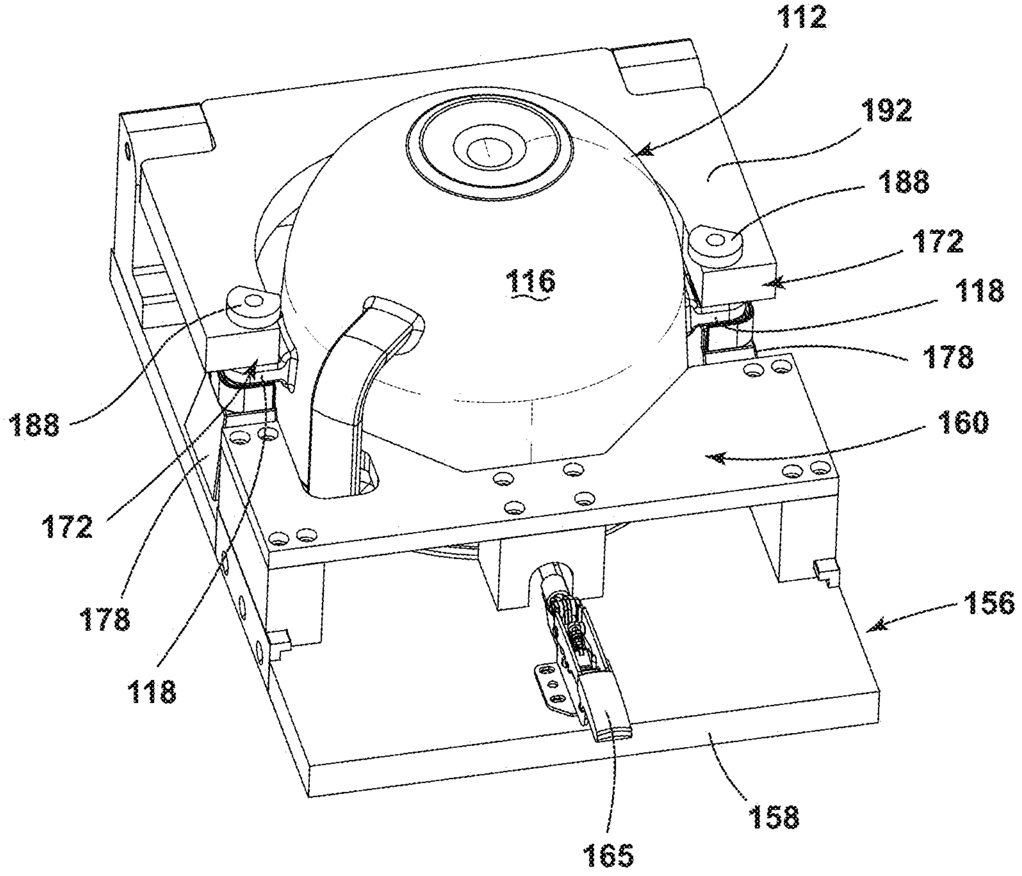
FIG. 10 is a perspective view of the mixing bowl received within the fixture of FIG. 9.

Turning now to FIGS. 9 and 10, a modified fixture 156 can be used in connection with the variation of the mixing bowl 110 described above with respect to FIGS. 4-6, wherein the inserts comprise upper and lower face plates 142 and 144. The present variation of the fixture 156 takes into account that the inserts 124 are assembled with the body 12 prior to location of the pin holes 126 such that the location features 172 are in the form of respective drill guides 188 mounted on the base 158 to facilitate formation of the pin holes 126 in the lower face plate 144 at the desired high tolerance with the otherwise assembled mixing bowl 110 received within the fixture 156. In this respect, the general construction of the fixture 156, including the base 158, and the sliding body 164 and fixed body 166 (including the respective retention features 160 and 162 defined thereon). Fixture 156 can also include pedestals 178 with generally flat upper surfaces 180 thereon for assisting in positioning the mounting flanges 118 and providing support therefor during drilling. Additionally, the pedestals 178 can define outer ridges 190 surrounding the outer portions of the upper surfaces 180 to increase the functionality of the pedestals 178 in positioning and/or supporting the mounting flanges 118.

In accordance with the above, the inserts 124 can be assembled with the body 112 of the mixing bowl 110 by placing the upper and lower face plates 142 and 144 in respective abutting contact with the top and bottom sides 130 and 122 of the mounting flanges 118 and affixing the face plates 142 and 144 together using the above-described screws 146 that extend through respective cavities 120 in the mounting flanges 118. The assembled mixing bowl 110 is then placed into the fixture 156 and secured by actuation of the vice clamp handle 165. The drill guides 188 can then be positioned adjacent the lower face places 144 of the inserts 124. In particular, the drill guides 188 can be received within a single frame 192 that is rotatably mounted to the base 158 such that it can be positioned as shown in FIG. 9 to allow the mixing bowl 110 to be assembled with the fixture 156 before being lowered into the position shown in FIG. 10 for use of the drill guides 188. In this manner, the frame 192 can be constructed and assembled with the drill guides 188 according to the high tolerance desired for the location of pin holes 126. Accordingly, the drill guides 188 can be used in connection with an appropriately-sized drill and bit to form the pin holes 126 in the lower face plates 144 with the frame 192 positioned as shown in FIG. 10 (including in connection with a depth-limiter to prevent holes from being formed in the upper face plates 142). The frame 192 can then be returned to the upward position shown in FIG. 9 and the completed mixing bowl 110 can be removed from the fixture 156.

In accordance with the above, it is to be appreciated that another aspect of the disclosure relates to a method for making a mixing bowl 10 or 110, as described above. In general, the method includes molding the body 12 or 112 of the mixing bowl 10 or 110 of the ceramic or other low tolerance material such that the body 12 or 112 defines the above-described interior 14 or 114 and exterior 16 or 116. As further discussed above, the body 12 or 112 is formed including the two mounting flanges 18 or 118 that extend outwardly from opposite sides of the exterior 16 or 116 and defining respective cavities 20 and 120 open at least on the bottom sides 22 or 122 of the mounting flanges 18 or 118. The method further includes locating the pin holes 26 and 126 relative to each other at the described high tolerance in connection with the assembly of the inserts 24 and 124 with the mounting flanges 18 or 118.

As discussed above, in connection with the variation of inserts 24 discussed above with respect to FIGS. 1-3, the pin holes 26 are located relative to each other at the high tolerance by assembly of the inserts 24 with the respective mounting flanges 18, with the pin holes 26 being formed in the inserts 24 prior to assembly of the inserts 24 with the mounting flanges 18. Additional aspects of the method for making the mixing bowl 10 in connection with these inserts 24 are to be understood based on the description of the fixture 56 set out above with respect to FIGS. 7 and 8, including the use of the fixture 56 in connection with the method.

Similarly, as discussed above, in connection with the variation of the inserts 124, discussed above, the inserts 124 may include the upper and lower face plates 142 and 144 respectfully abutting the top and bottom sides 130 and 122 of the mounting flanges 118 and fixed together to the mounting flanges 118 by the screws 146 that extend through the cavities 120. In such a method, it is appreciated that the pin holes 126 are located by formation thereof in the inserts 124 after assembly of the inserts 124 with the body 112. In particular, the pin holes 126 are drilled into the lower face plates 144 at the high tolerance. Additional aspects of the method for making the mixing bowl 110 in connection with these inserts 124 are to be understood based on the description of the fixture 156 set out above with respect to FIGS. 9 and 10, including the use of the fixture 156 in connection with the method. In particular, according to an aspect of the method, the pin holes 126 are located relative to each other at the high tolerance by positioning the drill guides 188 mounted on the base 158 of the fixture 156 adjacent the lower face places 144 of the inserts 124 (such as by the rotating frame 192 discussed above) and using the drill guides 188 to drill the pin holes 126 in the lower face plates 144 of the inserts 124.

The invention disclosed herein is further summarized in the following paragraphs and is further characterized by combinations of any and all of the various aspects described therein.

According to an aspect of the disclosure, a mixing bowl for a stand mixer includes a body defining an interior and an exterior. The body has first and second mounting flanges extending outwardly from opposite sides of the exterior and defining respective cavities open at least on bottom sides of the mounting flanges. The mixing bowl further includes first and second inserts fixedly received in the respective cavities of the first and second mounting flanges. The inserts define respective pin holes for receiving mounting pins of a bowl-lift mechanism of the stand mixer, the first and second pin holes being located relative to each other at a first tolerance and relative to the respective first and second flanges at a second tolerance lower than the first tolerance.

The body is of a first material exhibiting the second tolerance, and the mounting flanges are molded with the body of the first material.

The first material does not achieve the first tolerance in molding the flanges with the body, and the inserts are of a second material that accommodates location of the holes at the first tolerance.

The pin holes of the first and second inserts are defined within tubular extensions of the insert, and a face plate extends away from the tubular extensions in a direction normal to the pin holes to generally enclose each of the cavities along bottom sides of the mounting flanges.

The inserts are fixed in the mounting flanges with a cured epoxy mass partially filling the respective cavity and extending along inward-facing surfaces of the tubular bodies and the face plates.

The cavities of the first and second mounting flanges are further open on top sides of the mounting flanges, and the inserts comprise first and second face plates respectfully abutting the top and bottom sides of the mounting flanges and are fixed together by at least one mechanical fastener extending through the cavity.

The top and bottom sides of the first and second mounting flanges define inwardly tapered portions adjacent the respective cavities, and the first and second face plates abut the top and bottom sides of the mounting flanges at the tapered portions to locate the inserts at the first tolerance. The first and second pin holes are drilled into the second face plates at the first tolerance.

The body of the mixing bowl is molded from a material exhibiting the second tolerance, the first and second inserts are assembled with the body after the body is molded, and the pin holes are located relative to each other at the first tolerance and relative to the respective first and second flanges at the second tolerance using a fixture retaining the body of the mixing bowl in connection with the assembly of the first and second inserts with the body.

According to another aspect of the present disclosure, a fixture for locating first and second pin holes with respect to mounting flanges of a mixing bowl for a stand mixer includes a base configured to support a body of the mixing bowl in an inverted position. The body defines an interior and an exterior and includes first and second mounting flanges extending outwardly from opposite sides of the exterior and defining respective cavities open at least on bottom sides of the mounting flanges. The fixture further includes first and second retention features mounted on the base and collectively defining first and second features positioned to respectively contact the exterior of the mixing bowl to position the mixing bowl in a location with respect to the base at a first tolerance and first and second location features further mounted on the base and positioned to locate first and second pin holes, for receiving mounting pins of a bowl-lift mechanism, in inserts assembled with the mounting flanges of the mixing bowl relative to each other at a second tolerance that is higher than the first tolerance.

The exterior of the mixing bowl includes a first location feature in the form of a protrusion extending from the body at a predetermined location according to the first tolerance, and the feature of the first retention feature comprises a channel for receiving the protrusion during assembly of the mixing bowl with the fixture.

The first and second pin holes of the inserts are defined within respective tubular extensions of the insert, a face plate extending away from the tubular extensions in a direction normal to the pin holes, the first and second location features comprise first and second location pins configured for supporting the inserts by respective engagement with the first and second pin holes, the first and second location pins being mutually located according to the second tolerance, and the inserts are assembled with the mounting flanges using epoxy when the inserts are supported on the first and second location features and the mixing bowl is assembled with the fixture.

The inserts are fixed in the mounting flanges with a cured epoxy mass partially filling respective cavities in the mounting flanges and extending along inward-facing surfaces of the tubular bodies and the face plates.

The inserts comprise first and second face plates respectfully abutting top and bottom sides of the mounting flanges and being fixed together by at least one mechanical fastener extending through respective cavities in the mounting flanges, and the first and second location features comprise respective drill guides mounted on the base of the fixture so as to be positionable adjacent the second face places of the inserts according to the second tolerance when the mixing bowl is assembled with the fixture.

According to yet another aspect of the present disclosure, a method for making a mixing bowl for a stand mixer includes molding a body of the mixing bowl of a first material according to a first tolerance the body defining an interior and an exterior. The body includes first and second mounting flanges extending outwardly from opposite sides of the exterior and defining respective cavities open at least on bottom sides of the mounting flanges. The method further includes locating first and second pin holes relative to each other at a second tolerance that is higher than the first tolerance in connection with assembly of the inserts with the mounting flanges of the mixing bowl. The first and second pin holes are configured for receiving mounting pins of a bowl-lift mechanism.

The first and second pin holes are located relative to each other at the second tolerance by assembly of the inserts with the first and second mounting features, and the first and second pin holes are formed in the first and second inserts, respectively, prior to assembly of the inserts with the first and second mounting features.

The pin holes of the first and second inserts are defined within tubular extensions of the insert, a face plate extending away from the tubular extensions in a direction normal to the pin holes and generally enclosing the cavities along bottom sides of the mounting flanges, and the inserts are fixed in respective cavities in the mounting flanges with a cured epoxy mass partially filling the respective cavity and extending along inward-facing surfaces of the tubular bodies and the face plates.

The inserts comprise first and second face plates respectfully abutting the top and bottom sides of the mounting flanges and being fixed together by at least one mechanical fastener extending through the cavity, and the first and second pin holes are drilled into the second face plates at the first tolerance.

The pin holes are located relative to each other at the first tolerance and relative to the respective first and second flanges at the second tolerance using a fixture retaining the body of the mixing bowl in connection with the assembly of the first and second inserts with the body.

The method further includes assembling the pin holes of first and second inserts with first and second location features included in the fixture and assembling the body of the mixing bowl with a base of the fixture configured to support a body of the mixing bowl in an inverted position. Assembling the body of the mixing bowl with the base of the fixture positions the inserts within cavities of the mounting features. The method further includes, subsequently, fixing the first and second inserts with the first and second mounting flanges.

The method further includes fixing the first and second inserts with the first and second mounting flanges and, subsequently, assembling the body of the mixing bowl with a base of the fixture configured to support a body of the mixing bowl in an inverted position. The method further includes positioning first and second drill guides mounted on the base of the fixture adjacent face places of the inserts and using the first and second drill guides to drill the first and second pin holes in the face plates of the first and second inserts, respectively.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A mixing bowl for a stand mixer comprising:

a body defining an interior and an exterior, the body including first and second mounting flanges extending outwardly from opposite sides of the exterior and defining respective cavities open on respective top and bottom sides of the mounting flanges; and first and second inserts fixedly received in the respective cavities of the first and second mounting flanges, the inserts defining respective first and second pin holes for receiving mounting pins of a bowl-lift mechanism of the stand mixer, the first and second pin holes being located relative to each other at a first tolerance and relative to the respective first and second flanges at a second tolerance lower than the first tolerance, the inserts including first and second face plates respectfully abutting the top and bottom sides of the mounting flanges and being fixed together by at least one mechanical fastener extending through the cavity.

2. The mixing bowl of claim 1, wherein:

the body is of a first material; and the mounting flanges are molded with the body of the first material according to a first process carried out according to the second tolerance.

3. The mixing bowl of claim 2, wherein:

the first material does not achieve the first tolerance in molding the flanges with the body; and the inserts are of a second material that accommodates location of the holes at the first tolerance.

4. The mixing bowl of claim 1, wherein the first and second pin holes are defined within respective first and second tubular extensions of the first and second inserts; and first and second face plates extend away from each of the first and second tubular extensions in respective directions normal to the first and second pin holes and generally respectively enclose the cavities along bottom sides of the first and second mounting flanges.

5. The mixing bowl of claim 4, wherein the first and second inserts each are fixed in the respective first and second mounting flanges with a cured epoxy mass partially filling the respective cavity and extending along inward-facing surfaces of the first and second tubular extensions and the first and second face plates.

6. The mixing bowl of claim 1, wherein:

the top and bottom sides of the first and second mounting flanges define inwardly tapered portions adjacent the respective cavities, the first and second face plates abutting the top and bottom sides of the mounting flanges at the tapered portions to locate the inserts at the first tolerance.

7. The mixing bowl of claim 6, wherein the first and second pin holes are drilled into the second face plate at the first tolerance.

8. The mixing bowl of claim 1, wherein:

the body of the mixing bowl is molded from a material exhibiting the second tolerance; and the first and second inserts are assembled with the body after the body is molded.

9. The mixing bowl of claim 8, wherein the pin holes are located relative to each other at the first tolerance and relative to the respective first and second flanges at the second tolerance using a fixture retaining the body of the mixing bowl in connection with assembling the first and second inserts with the body.

10. A mixing bowl for a stand mixer comprising:

a body defining an interior and an exterior, the body including first and second mounting flanges extending outwardly from opposite sides of the exterior and defining respective cavities open on respective top and bottom sides of the mounting flanges, the exterior of the mixing bowl including a first location feature in the form of a protrusion extending from the body at a predetermined location according to a first tolerance; and first and second inserts fixedly received in the respective cavities of the first and second mounting flanges, the inserts defining respective first and second pin holes for receiving mounting pins of a bowl-lift mechanism of the stand mixer, the first and second pin holes being located relative to each other at the first tolerance and relative to the respective first and second flanges at a second tolerance lower than the first tolerance, the first and second inserts including first and second face plates respectfully abutting the top and bottom sides of the mounting flanges and being fixed together by at least one mechanical fastener extending through the cavity.

11. The mixing bowl of claim 10, wherein:

the body is of a first material; and the mounting flanges are molded with the body of the first material according to a first process carried out according to the second tolerance.

12. The mixing bowl of claim 11, wherein:

the first material does not achieve the first tolerance in molding the flanges with the body; and the inserts are of a second material that accommodates location of the holes at the first tolerance.

13. The mixing bowl of claim 10, wherein the first and second pin holes are defined within respective first and second tubular extensions of the first and second inserts; and first and second face plates extend away from each of the first and second tubular extensions in respective directions normal to the first and second pin holes and generally respectively enclose the cavities along bottom sides of the first and second mounting flanges.

14. The mixing bowl of claim 13, wherein the first and second inserts each are fixed in the respective first and second mounting flanges with a cured epoxy mass partially filling the respective cavity and extending along inward-facing surfaces of the first and second tubular extensions and the first and second face plates.

15. The mixing bowl of claim 10, wherein:

the top and bottom sides of the first and second mounting flanges define inwardly tapered portions adjacent the respective cavities, the first and second face plates abutting the top and bottom sides of the mounting flanges at the tapered portions to locate the inserts at the first tolerance; and the first and second pin holes are drilled into the second face plate at the first tolerance.

16. The mixing bowl of claim 10, wherein:

the body of the mixing bowl is molded from a material exhibiting the second tolerance;

the first and second inserts are assembled with the body after the body is molded; and the pin holes are located relative to each other at the first tolerance and relative to the respective first and second flanges at the second tolerance using a fixture retaining the body of the mixing bowl in connection with assembling the first and second inserts with the body, the fixture defining a channel for receiving the protrusion during assembly of the mixing bowl with the fixture to align the body relative to the fixture for assembly of the first and second inserts therewith.

17. A mixing bowl for a stand mixer comprising:

a body defining an interior and an exterior, the body including first and second mounting flanges extending outwardly from opposite sides of the exterior and defining respective cavities open on respective top and bottom sides of the mounting flanges; and first and second inserts fixedly received in the respective cavities of the first and second mounting flanges, the inserts defining respective first and second pin holes for receiving mounting pins of a bowl-lift mechanism of the stand mixer, the first and second pin holes being located relative to each other at a first tolerance by assembly of the first and second inserts with the first and second mounting flanges and relative to the respective first and second flanges at a second tolerance lower than the first tolerance, the first and second pin holes being formed in the first and second inserts, respectively, prior to assembly of the inserts with the first and second mounting flanges, the inserts including first and second face plates respectfully abutting the top and bottom sides of the mounting flanges and being fixed together by at least one mechanical fastener extending through the cavity.

* * * * *